US012673552B2

(12) United States Patent
Heo et al.

(10) Patent No.: US 12,673,552 B2
(45) Date of Patent: Jul. 7, 2026

(54) HEAD-UP HAPTIC DISPLAY DEVICE FOR VEHICLE

(71) Applicant: Korea University Of Technology And Education Industry—University Cooperation Foundation, Cheonan-si (KR)

(72) Inventors: Yong Hae Heo, Cheonan-si (KR); Dong-Soo Choi, Seoul (KR); Sang-Youn Kim, Seoul (KR)

(73) Assignee: Korea University Of Technology And Education Industry-University Cooperation Foundation, Cheonan-si (KR)

( * ) Notice: Subject to any disclaimer, the term of this patent is extended or adjusted under 35 U.S.C. 154(b) by 174 days.

(21) Appl. No.: 18/613,283

(22) Filed: Mar. 22, 2024

(65) Prior Publication Data

US 2025/0206136 A1      Jun. 26, 2025

(30) Foreign Application Priority Data

Dec. 26, 2023    (KR) ........................ 10-2023-0191823

(51) Int. Cl.
B60K 35/25        (2024.01)
B60K 35/23        (2024.01)

(52) U.S. Cl.
CPC .............. B60K 35/25 (2024.01); B60K 35/23 (2024.01); B60K 2360/1468 (2024.01)

(58) Field of Classification Search
CPC ....................................................... G06F 3/016
See application file for complete search history.

(56) References Cited

U.S. PATENT DOCUMENTS

| | | | | |
|---|---|---|---|---|
| 7,952,566 B2 * | 5/2011 | Poupyrev | ................ | G06F 3/016 |
| | | | | 345/173 |
| 2012/0131455 A1 * | 5/2012 | Han | ........................ | B60K 35/50 |
| | | | | 715/702 |
| 2015/0323995 A1 * | 11/2015 | Lim | ........................ | G06F 3/016 |
| | | | | 345/174 |
| 2018/0004294 A1 * | 1/2018 | Eraslan | .............. | G06F 3/04886 |
| 2020/0264772 A1 | 8/2020 | Kussmann et al. | | |
| 2023/0007374 A1 * | 1/2023 | Zhou | ........................ | H04R 9/025 |

(Continued)

FOREIGN PATENT DOCUMENTS

KR      10-2018-0133360 A      12/2018

*Primary Examiner* — Nan-Ying Yang
(74) *Attorney, Agent, or Firm* — Studebaker Brackett PLLC

(57)        ABSTRACT

Disclosed is a head-up haptic display device for a vehicle including a display unit for displaying information on a display area and sensing a touch input and a pressing input of a user with respect to the display area; a haptic unit for providing the display area with vibration, and a resistance force with respect to the pressing input; and a control unit for determining whether the touch input is sensed in a button area within the display area, controlling the haptic unit to provide the vibration to the display area based on whether the touch input is sensed, determining whether the pressing input is sensed in each of a non-button area within the display area except the button area and the button area, and controlling the haptic unit to provide the resistance force to the display area based on whether the pressing input is sensed.

5 Claims, 11 Drawing Sheets

(56) References Cited

U.S. PATENT DOCUMENTS

| 2023/0013539 A1 * | 1/2023 | Holland | ............... G06F 3/1423 |
| 2023/0122318 A1 * | 4/2023 | Sheikholeslami | ....... G08B 6/00 |
| | | | 340/407.1 |

* cited by examiner

<u>100</u>

100

(a)                                        (b)

(a)                                                    (b)

(a)                                                    (b)

HEAD-UP HAPTIC DISPLAY DEVICE FOR VEHICLE

CROSS-REFERENCE TO RELATED APPLICATIONS

This application claims priority to and the benefit of Korean Patent Application No. 10-2023-0191823 filed in the Korean Intellectual Property Office on Dec. 26, 2023, the entire contents of which are incorporated herein by reference.

TECHNICAL FIELD

The present invention relates to a head-up haptic display device for a vehicle, and more specifically, to a head-up haptic display device for a vehicle that allows a user to recognize whether the user touches a button area and whether the user presses the button area or a non-button area, even without looking at a display area by providing vibration, and a resistance force with respect to a pressing input depending on the user's touch input and pressing input sensed within the display area.

BACKGROUND ART

For the safety and convenience of vehicle users, a vehicle is increasingly equipped with various sensors and devices, and vehicle functions are being diversified. These vehicle functions can be classified into convenience functions for promoting driver convenience, and safety functions for promoting driver and/or pedestrian safety.

The convenience functions of a vehicle have a motivation for development related to driver convenience, such as providing infotainment (information+entertainment) functions to the vehicle, supporting partial autonomous driving functions, and helping to ensure a driver's field of vision such as night vision or blind spots. For example, there are active cruise control (ACC), smart parking assist system (SPAS), night vision (NV), head up display (HUD), around view monitor (AVM) and adaptive headlight system (AHS) functions.

However, there is a problem that the likelihood of an accident increases in the course of the information about the vehicle being provided to the driver during driving and the driver operating the infotainment system.

Accordingly, there is a demand for technology that provides information through haptics rather than providing information visually to the driver or guides infotainment operations through haptics.

As used herein, haptics is a tactile sensation that can be felt with a person's fingertip (a fingertip or stylus pen) when touching an object and is a concept encompassing a tactile sensation (tactile feedback) felt when the skin touches a surface of the object and a kinesthesia (kinesthetic feedback) felt when movement of joints and muscles is interrupted.

There is a need for development of an interface device that can provide the tactile feedback and the kinesthetic feedback at the same time, thereby enabling an input or conveying a tactile sense to a user intuitively by stroke or touch like a touchpad, leading to communication with the user.

SUMMARY OF THE INVENTION

The present invention has been made in an effort to provide a head-up haptic display device for a vehicle that allows a user to recognize whether the user touches a button area and whether the user presses the button area or a non-button area, even without looking at a display area by providing vibration, and a resistance force with respect to a pressing input depending on the user's touch input and pressing input sensed within the display area.

An exemplary embodiment of the present invention provides a head-up haptic display device for a vehicle including a display unit configured to display information on a display area and to sense a touch input and a pressing input of a user with respect to the display area; a haptic unit configured to provide the display area with vibration, and a resistance force with respect to the pressing input; and a control unit configured to determine whether the touch input is sensed in a button area within the display area, to control the haptic unit to provide the vibration to the display area based on whether the touch input is sensed, to determine whether the pressing input is sensed in each of a non-button area within the display area except the button area and the button area, and to control the haptic unit to provide the resistance force to the display area based on whether the pressing input is sensed.

When it is determined that the touch input is sensed in the non-button area and is then sensed in the button area, the control unit may control the haptic unit to provide the vibration to the display area.

When it is determined that the touch input is sensed in the button area, the control unit may control the haptic unit to provide the vibration to the display area.

When it is determined that the pressing input is sensed in the button area, the control unit may control the haptic unit to provide the resistance force of a first magnitude to the display area.

When it is determined that the pressing input is sensed in the non-button area, the control unit may control the haptic unit to provide the resistance force of a second magnitude greater than the first magnitude to the display area.

The haptic unit may include a cover installed on a rear surface of the display unit; a housing formed in a tubular shape with one side open, the open side being closed with the cover, and an accommodation space being formed inside the housing; a magnetorheological elastic body configured to support the cover in a state in which one surface is in contact with an inner surface of the cover, the magnetorheological elastic body being accommodated in the accommodation space and having a thickness and a rigidity that change depending on an applied magnetic field; and a magnetic field generator accommodated in the accommodation space and configured to generate the magnetic field in the magnetorheological elastic body.

The control unit may be configured to control whether to generate a magnetic field by the magnetic field generator and an intensity of the magnetic field so that the thickness of the magnetorheological elastic body is changed to provide the vibration to the display area, and to control whether to generate a magnetic field by the magnetic field generator and an intensity of the magnetic field So that the rigidity of the magnetorheological elastic body is changed to provide the resistance force to the display area.

One aspect of the present invention has an advantage that it is possible to allow a user to recognize whether the user touches the button area and whether the user presses the button area or the non-button area without looking at the display area by providing the vibration, and the resistance force with respect to the pressing input depending on the user's touch input and pressing input sensed within the display area.

DETAILED DESCRIPTION

Hereinafter, preferred exemplary embodiments will be presented for better understanding of the present invention. However, the following exemplary embodiments are only provided so that the present invention can be more easily understood. Therefore, the content of the present invention should not be construed as being limited to the exemplary embodiments set forth herein.

Figure 1:
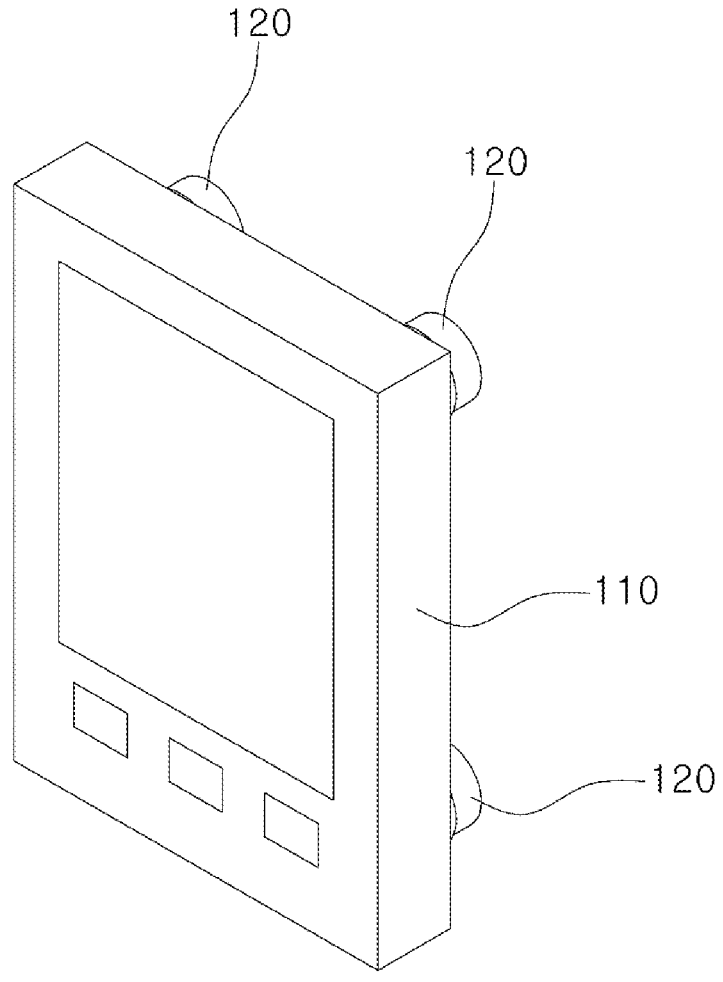
FIG. 1 is a front perspective view of a head-up haptic display device for a vehicle according to an exemplary embodiment of the present invention.
Figure 2:
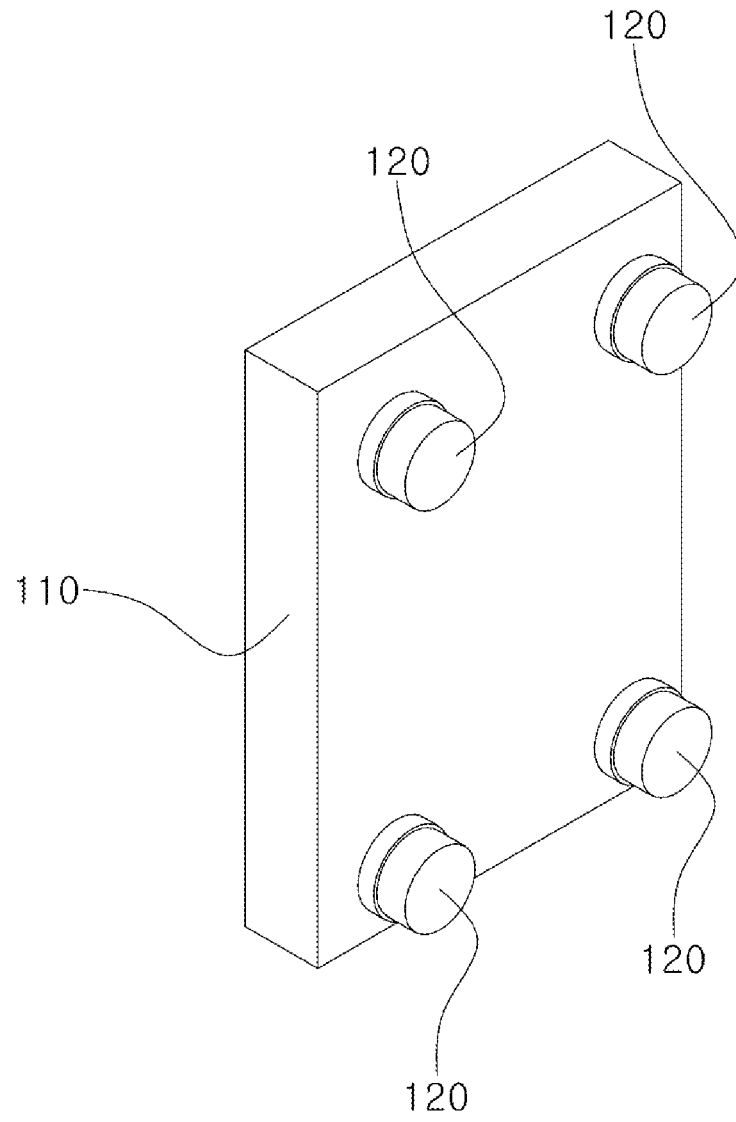
FIG. 2 is a rear perspective view of the head-up haptic display device for a vehicle according to the exemplary embodiment of the present invention.
Figure 3:
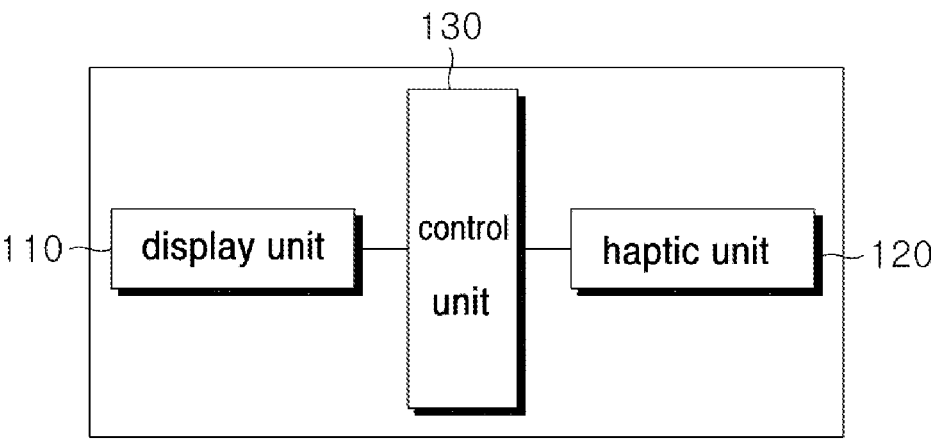
FIG. 3 is a block diagram of the head-up haptic display device for a vehicle according to the exemplary embodiment of the present invention.
Figure 4:
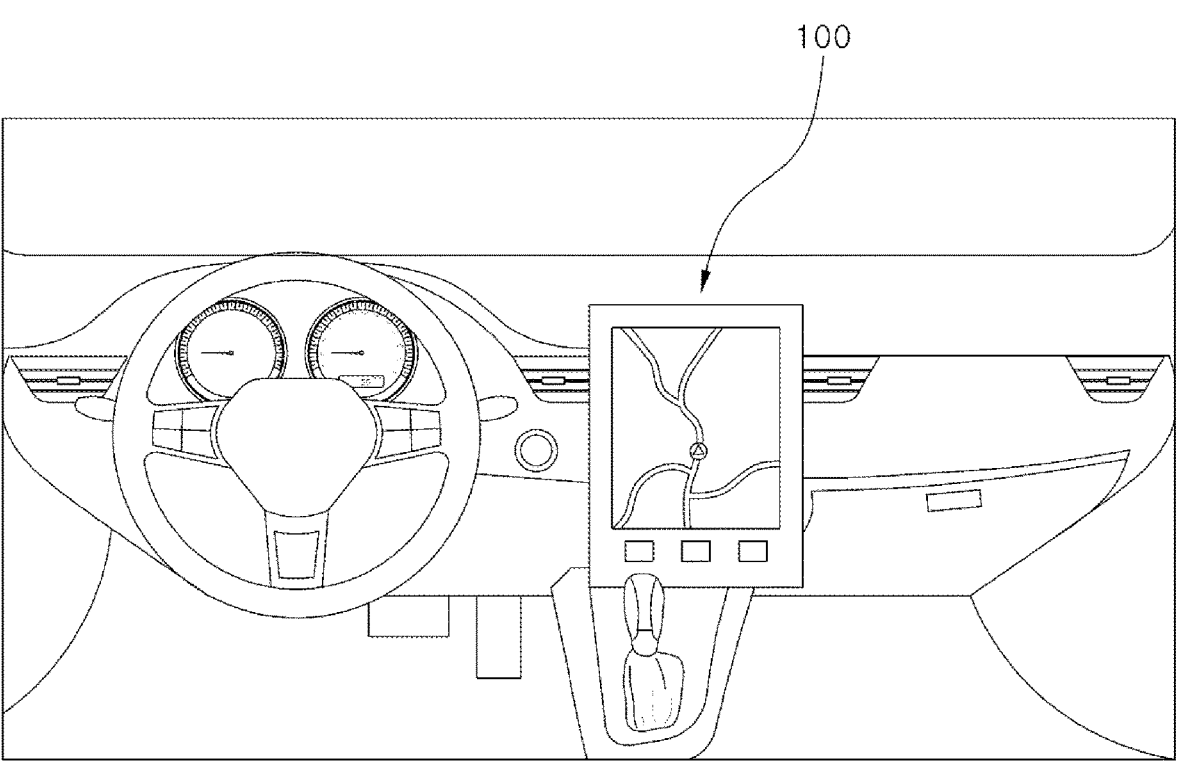
FIG. 4 is a view showing a state in which the head-up haptic display device for a vehicle according to the exemplary embodiment of the present invention is mounted on a vehicle.

FIG. 1 is a front perspective view of a head-up haptic display device for a vehicle according to an exemplary embodiment of the present invention, FIG. 2 is a rear perspective view of the head-up haptic display device for a vehicle according to the exemplary embodiment of the present invention, FIG. 3 is a block diagram of the head-up haptic display device for a vehicle according to the exemplary embodiment of the present invention, and FIG. 4 is a view showing a state in which the head-up haptic display device for a vehicle according to the exemplary embodiment of the present invention is mounted on a vehicle.

Referring to FIGS. 1 to 4, a head-up haptic display device 100 for a vehicle according to an exemplary embodiment of the present invention may be a device that is installed inside a vehicle to display information about the vehicle and to receive a user's request to control an electronic device of the vehicle.

Here, the electronic device of the vehicle may be one or more of an air conditioning device, a multimedia device, a navigation device, and a vehicle information inquiry device.

The head-up haptic display device 100 for a vehicle according to the exemplary embodiment of the present invention may include a display unit 110, a haptic unit 120, and a control unit 130.

The display unit 110 may display vehicle-related information on a display area.

In addition, the display unit 110 may sense a touch input and a pressing input of a user with respect to the display area.

To this end, the display unit 110 may be a display module including a touch panel for sensing a touch input and a pressing sensor for sensing a pressing input.

When a touch input is sensed, the display unit 110 may output a touch point where the touch input was made to the control unit 130, and when a pressing input is sensed, the display unit 110 may output a pressing point where the pressing input was made to the control unit 130.

The haptic unit 120 may be attached to a rear surface of the display unit 110 to provide vibration to the display area and to provide, to the display area, a resistance force with respect to a pressing input.

Here, the resistance force refers to a force in a direction opposite to a force applied through the pressing input. The greater the resistance force, the smaller the deformation of the display unit 110 and the haptic unit 120 due to the pressing input.

The vibration and resistance force provided by the haptic unit 120 may be controlled by the control unit 130.

Specifically, the control unit 130 may control vibration and a resistance force provided to the display area by the haptic unit 120, based on a touch input and a pressing input sensed from the display unit 110.

A process in which the control unit 130 controls the haptic unit 120 will be described below in detail.

Figure 5:
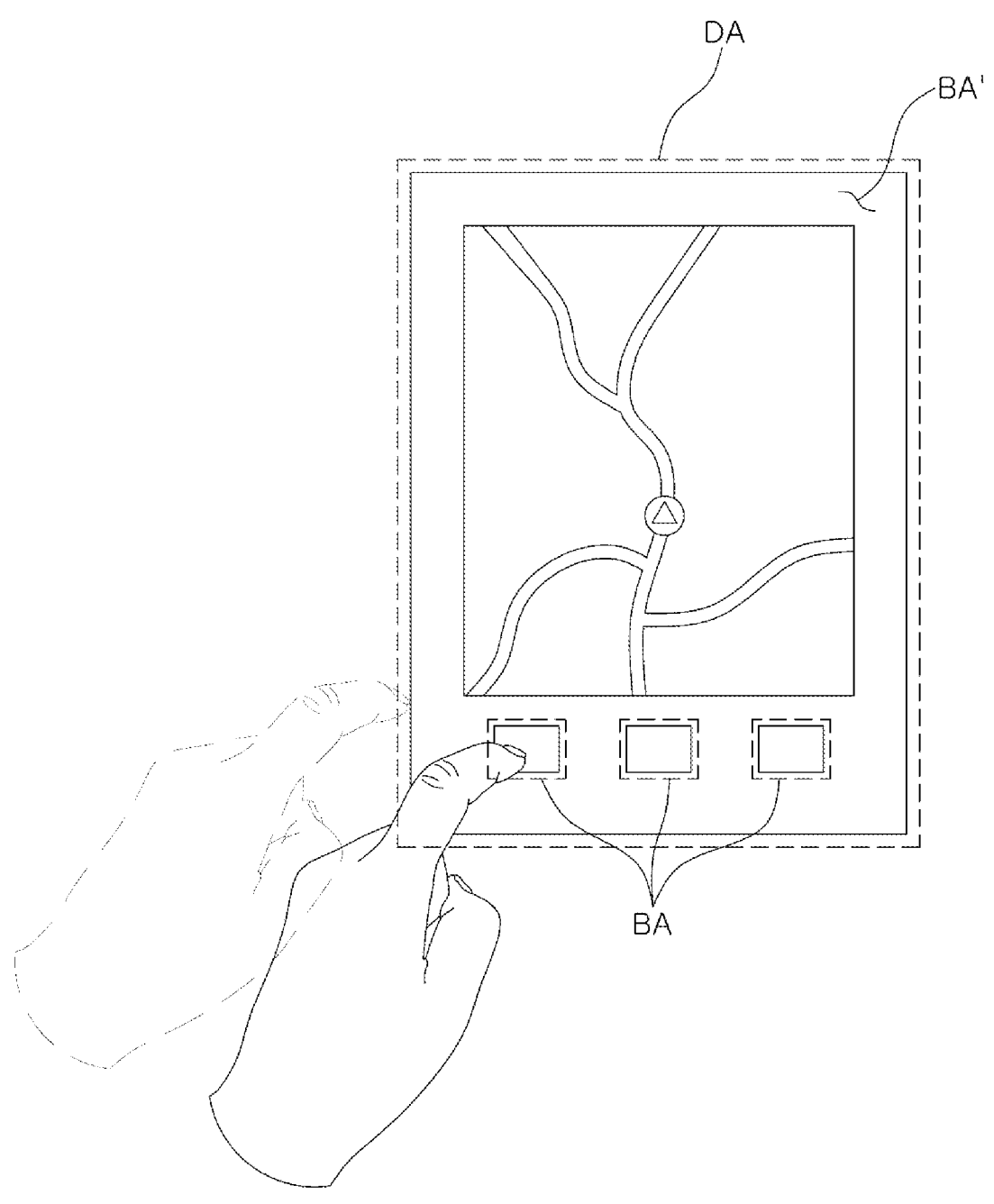
FIG. 5 is a view for illustrating a process in which the head-up haptic display device for a vehicle according to the exemplary embodiment of the present invention provides vibration.

FIG. 5 is a view for illustrating a process in which the head-up haptic display device for a vehicle according to the exemplary embodiment of the present invention provides vibration.

Referring to FIG. 5, the control unit 130 may determine whether a touch input is sensed in a button area BA within a display area DA and control the haptic unit 120 to provide vibration to the display area DA based on whether the touch input is sensed.

To this end, the display unit 110 may be provided with the display area DA, which is an area where information is displayed, and the display area DA may include a button area BA that can receive a button input from a user and a non-button area BA' that is an area other than the button area BA.

For example, when a user inputs a button input by pressing the button area BA, the display unit 110 may sense the pressing on the button area BA and output a pressing sensing signal to the control unit 130, and the control unit 110 130 may activate a button function corresponding to the button area BA where the pressing is sensed. In this case, in the button area BA, a button image and a text showing a button function activated when the corresponding button area BA is pressed may be displayed.

On the other hand, when it is determined that a touch input is sensed in the non-button area BA' and is then sensed in the button area BA, the control unit 130 may control the haptic unit 120 to provide the vibration to the display area DA.

Specifically, when a touch point output by the display unit 110 sensing a touch input is included in the non-button area BA' and is then included in the button area BA, the control unit 130 may control the haptic unit 120 to provide the vibration to the display area DA.

With this, when the user touches the button area BA while moving on touch points in a state of touching a specific point in the display area DA in order to find the button area BA while unable to look at the display area DA due to driving, the control unit 130 controls the haptic unit 120 to provide vibration to the display area DA, allowing the user to recognize that the user is touching the button area BA, even without looking at the button area BA.

On the other hand, when it is determined that a touch input is sensed in the button area BA, the control unit 130 may control the haptic unit 120 to provide vibration to the display area DA.

Specifically, when a touch point output by the display unit 110 sensing a touch input is included in the button area BA, the control unit 130 may control the haptic unit 120 to provide the vibration to the display area DA.

With this, when the user touches the button area BA while unable to look at the display area DA due to driving, the control unit 130 controls the haptic unit 120 to provide vibration to the display area DA, allowing the user to recognize that the user is touching the button area BA, even without looking at the button area BA.

Figure 6:
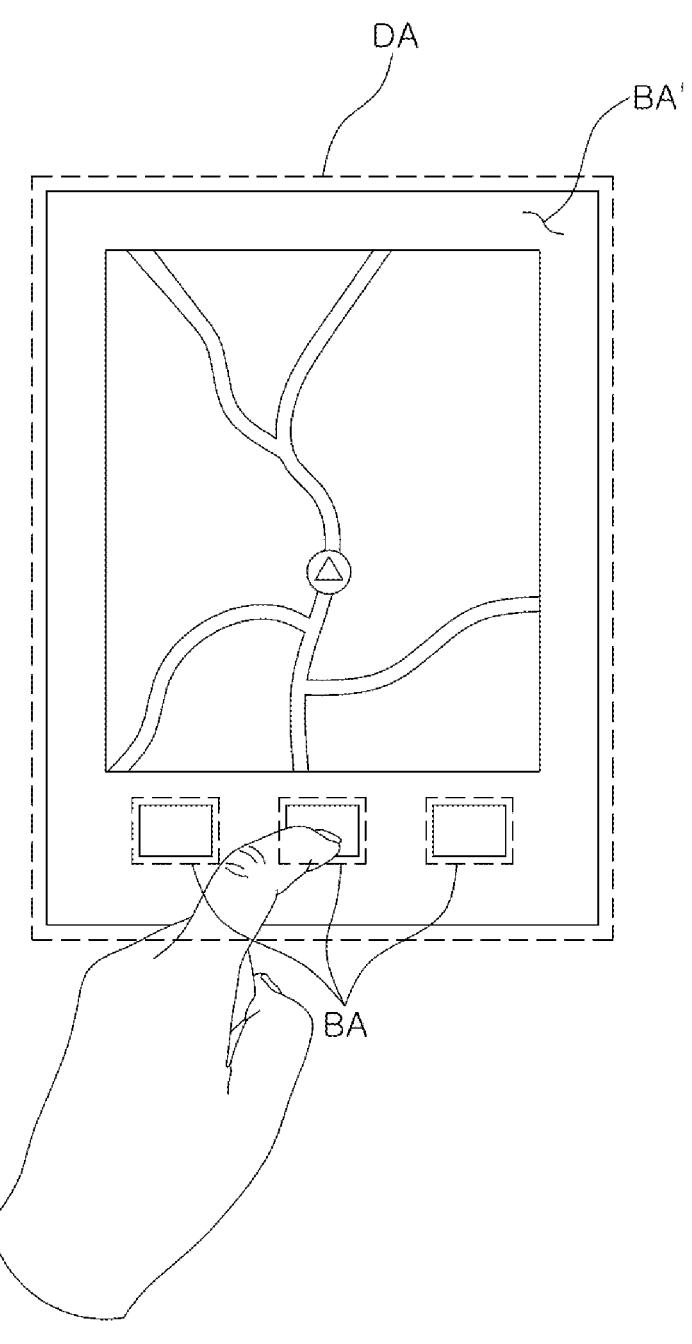
FIG. 6 is a view for illustrating a process in which the head-up haptic display device for a vehicle according to the exemplary embodiment of the present invention provides a resistance force of a first magnitude with respect to a pressing input.
Figure 7:
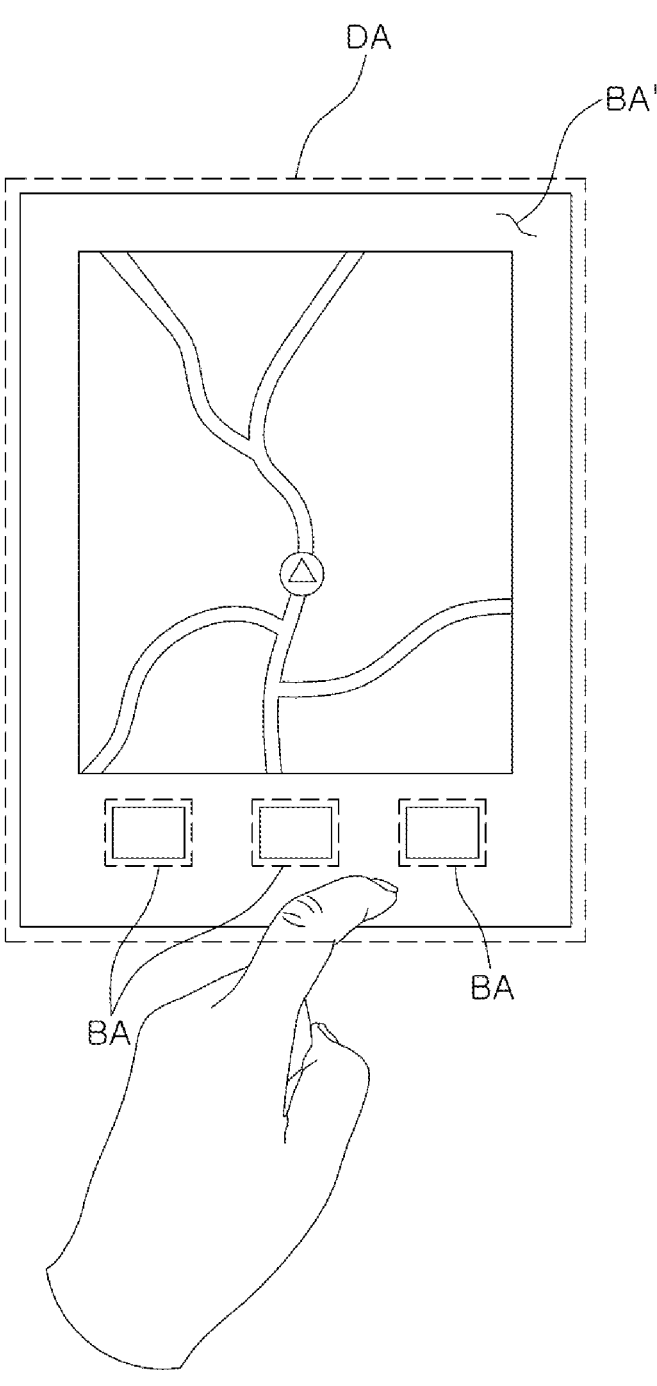
FIG. 7 is a view for illustrating a process in which the head-up haptic display device for a vehicle according to the exemplary embodiment of the present invention provides a resistance force of a second magnitude with respect to a pressing input.

FIG. 6 is a view for illustrating a process in which the head-up haptic display device for a vehicle according to the exemplary embodiment of the present invention provides a resistance force of a first magnitude with respect to a pressing input, and FIG. 7 is a view for illustrating a process in which the head-up haptic display device for a vehicle according to the exemplary embodiment of the present invention provides a resistance force of a second magnitude with respect to a pressing input.

Referring further to FIGS. 6 and 7, the control unit 130 may determine whether a pressing input is sensed in each of the non-button area BA' and the button area BA, and control the haptic unit 130 to provide a resistance force to the display area DA based on whether the pressing input is sensed.

Specifically, when it is determined that a pressing input is sensed in the button area BA, the control unit 130 may control the haptic unit 120 to provide a resistance force of a first magnitude to the display area DA.

More specifically, when a pressing point output by the display unit 110 sensing a pressing input is included in the button area BA, the control unit 130 may control the haptic unit 120 to provide a resistance force of a first magnitude to the display area DA.

On the other hand, when it is determined that a pressing input is sensed in the non-button area BA', the control unit 130 may control the haptic unit 120 to provide a resistance force of a second magnitude to the display area DA.

Specifically, when a pressing point output by the display unit 110 sensing a pressing input is included in the non-button area BA', the control unit 130 may control the haptic unit 120 to provide a resistance force of a second magnitude to the display area DA.

Here, the resistance force of a first magnitude may be a force of a magnitude smaller than the resistance force of a second magnitude.

That is, when the user presses a specific point within the display area DA in order to press the button area BA while unable to look at the display area DA due to driving, the haptic unit 120 is controlled to provide the resistance force of the second magnitude relatively greater than the first magnitude if the specific point is within the non-button area BA', allowing the user to recognize that the user is currently pressing the non-button area BA'.

On the other hand, when the user presses a specific point within the display area DA in order to press the button area BA while unable to look at the display area DA due to driving, the haptic unit 120 is controlled to provide the resistance force of the first magnitude relatively smaller than the second magnitude if the specific point is within the button area BA, allowing the user to recognize that the user is currently pressing the button area BA.

With this, when pressing the button area BA other than the non-button area BA', the user senses that the pressing point is pressed more softly due to the resistance force of the smaller first magnitude, and when pressing the non-button area BA' other than the button area BA, the user senses that the pressing point is pressed harder due to the resistance force of the greater second magnitude, so that the user can recognize that the user is currently pressing the button area BA or the non-non-button area BA', even without looking at the display area DA.

Hereinafter, the haptic unit 130 that provides the above-described vibration and resistance force will be described in detail.

Figure 8:
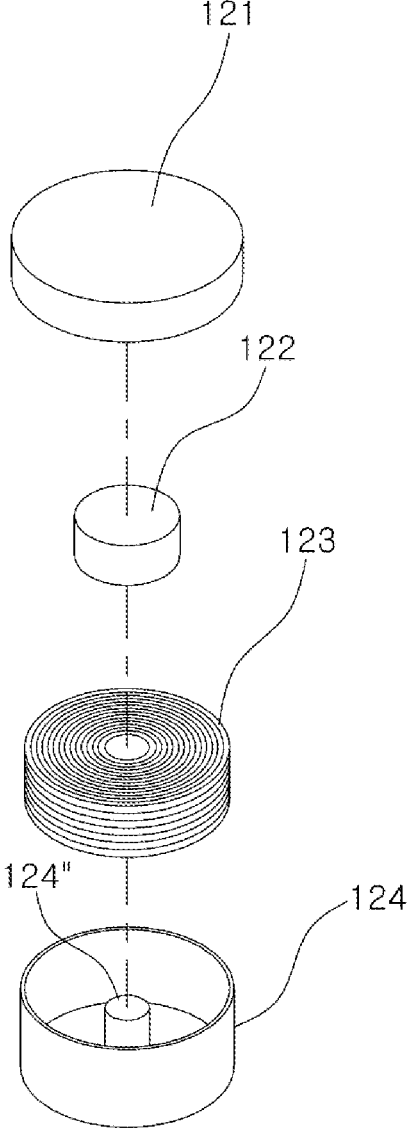
FIG. 8 is an exploded perspective view of a haptic unit included in the head-up haptic display device for a vehicle according to the exemplary embodiment of the present invention.

FIG. 8 is an exploded perspective view of a haptic unit included in the head-up haptic display device for a vehicle according to the exemplary embodiment of the present invention.

Referring to FIG. 8, the haptic unit 120 may include a cover 121, a magnetorheological elastic body 122, a magnetic field generator 123, and a housing 124.

The cover 121 is located at the top of the haptic unit 120 and may serve as a medium that directly or indirectly transmits deformation or vibration of the magnetorheological elastic body 122 located below to the user.

The cover 121 is preferably made of a magnetic material capable of inducing magnetic lines of force.

An inner bottom surface of the cover 121 may face and be in contact with an upper surface of the magnetorheological elastic body 122.

Accordingly, the cover 121 may be moved up and down together with the magnetorheological elastic body 122 as the magnetorheological elastic body 122 is deformed or vibrated.

In addition, a portion of the upper part of the magnetorheological elastic body 122 may be accommodated inside the cover 121, and the remainder of the magnetorheological elastic body 122 may be accommodated inside the housing 124.

In this case, the cover 121 is coupled to close one open side of the housing 124, and may be moved up and down and vibrated as the magnetorheological elastic body 122 is deformed or vibrated.

To this end, the cover 121 may be formed in a cylindrical shape with an open bottom, and an edge thereof may be formed with an insertion groove 121' into which a sidewall 124' of the housing 124 is inserted.

The sidewall 124' of the housing 124 is inserted into the insertion groove 121', so that when the cover 121 moves up and down, the cover 121 may be guided by the sidewall 124' of the housing 124.

Note that, the insertion groove 121' may have an entrance narrower than a width of a separation prevention protrusion protruding from the sidewall 124' of the housing 124.

Accordingly, even when the cover 121 moves excessively upward, the separation prevention protrusion is caught at the entrance of the insertion groove 121' formed narrower than the width of the separation prevention protrusion 153, thereby preventing the cover 121 from being separated and detached from the housing 124.

The magnetorheological elastic body 122 may be made of a polymer elastic material and magnetic powder dispersed therein. For example, the polymer elastic material may be made of silicone rubber material, and the magnetic powder may be made of carbonyl iron powder.

The magnetorheological elastic body 122 may be a porous magnetorheological elastic body with a porous structure.

Note that a thickness (volume) and a rigidity of the magnetorheological elastic body 122 may change depending on an applied magnetic field. Specifically, when a magnetic field is not applied to the magnetorheological elastic body 122, the magnetic powder is randomly arranged in an irregular distribution, so that the magnetorheological elastic body 122 has soft elasticity and can maintain its initial thickness when manufactured.

However, when a magnetic field is applied to the magnetorheological elastic body 122, the magnetic powder forms a chain and is arranged regularly, so that the magnetorheological elastic body 122 has higher rigidity than when the magnetic field is not applied and may be thinner than its initial thickness when manufactured.

In this case, as the intensity of the applied magnetic field increases, the magnetorheological elastic body 122 may have higher rigidity and may be further thinner than its initial thickness when manufactured.

The magnetic field generator 123 is located below the magnetorheological elastic body 122 and can generate a magnetic field.

By being controlled by the control unit 130, the magnetic field generator 123 cannot generate a magnetic field or can generate a magnetic field, and when generating a magnetic field, the intensity of the magnetic field can be controlled.

The magnetic field generator 123 may be a coil 123 formed by winding a conductive wire on a core 124" formed in the housing 124.

A lower surface of the coil 123 may be arranged to face and be in contact with a lower surface of the magnetorheological elastic body 122.

The coil 123 may be connected to a power supply (a battery, or the like) through a switching means.

In addition, the coil 123 may receive current from an electrically connected power supply in response to control of the control unit 130 for the switching means, and generate a magnetic field when the current flows.

In order to change the thickness and rigidity of the magnetorheological elastic body 122 to vibrate the cover 121 up and down and to provide a resistance force to the display area DA, the control unit 130 may be electrically connected to the magnetic field generator (coil, 130) and control the magnetic field generator (coil, 130) regarding whether to generate a magnetic field and the intensity of the magnetic field.

With this, the control unit 130 may provide the user with a sense of vibration and a resistance force with respect to pressing by changing the thickness and rigidity of the magnetorheological elastic body 122.

Figure 9:
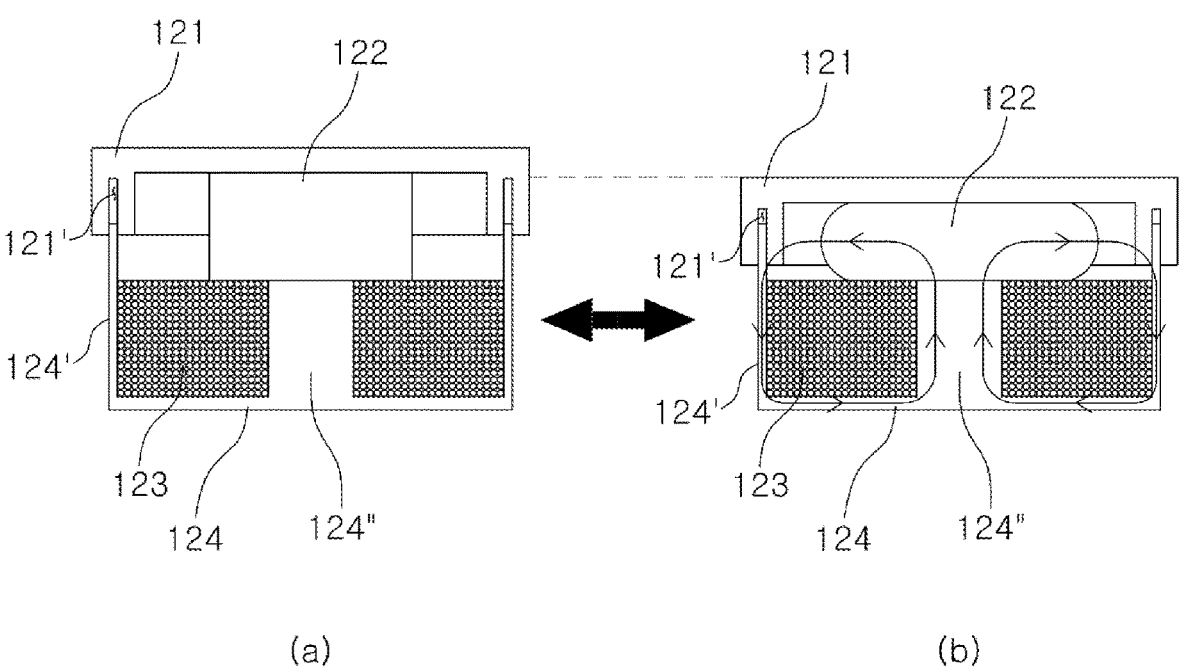
FIG. 9 shows views for illustrating an operation that is performed when the haptic unit included in the head-up haptic display device for a vehicle according to the exemplary embodiment of the present invention provides vibration.

FIG. 9 shows views for illustrating an operation that is performed when the haptic unit included in the head-up haptic display device for a vehicle according to the exemplary embodiment of the present invention provides vibration.

When a touch input is not sensed, the control unit 130 may perform control so that a magnetic field is not generated from the coil 123 by interrupting the current applied to the coil 123, as shown in (a) of FIG. 9.

Specifically, the control unit 130 may turn off the switching means electrically connected between the coil 123 and the power supply so that the current output from the power supply electrically connected to the coil 123 is interrupted.

Accordingly, the thickness of the magnetorheological elastic body 122 can be maintained at its initial thickness, and the height of the cover 121 located at the top of the magnetorheological elastic body 122 can be maintained at its maximum height.

Thereafter, when a touch input is sensed in the button area BA, the control unit 130 may perform control so that a magnetic field is generated from the coil 123 by applying current to the coil 123, as shown in (b) of FIG. 9.

Specifically, the control unit 130 may turn on the switching means electrically connected between the coil 123 and the power supply so that current is applied to the coil 123 from the power supply electrically connected to the coil 123.

Accordingly, the magnetorheological elastic body 122 located at the top of the coil 123 that generates a magnetic field as current is applied thereto may be applied with the magnetic field and become thinner.

Thereafter, when the control unit 130 performs control so that the magnetic field is not generated from the coil 123 by interrupting the current applied to the coil 123, the magnetic field is not applied to the magnetorheological elastic body 122, so that a shape of the magnetorheological elastic body may be restored, changing the thickness to the initial thickness.

The control unit 130 may repeatedly turn on and turn off the switching means electrically connected between the coil 123 and the power supply to change the thickness of the magnetorheological elastic body 122, and vibrate the cover 121 as a result of the change in the thickness of the magnetorheological elastic body 122, providing vibration to the display area DA.

Figure 10:
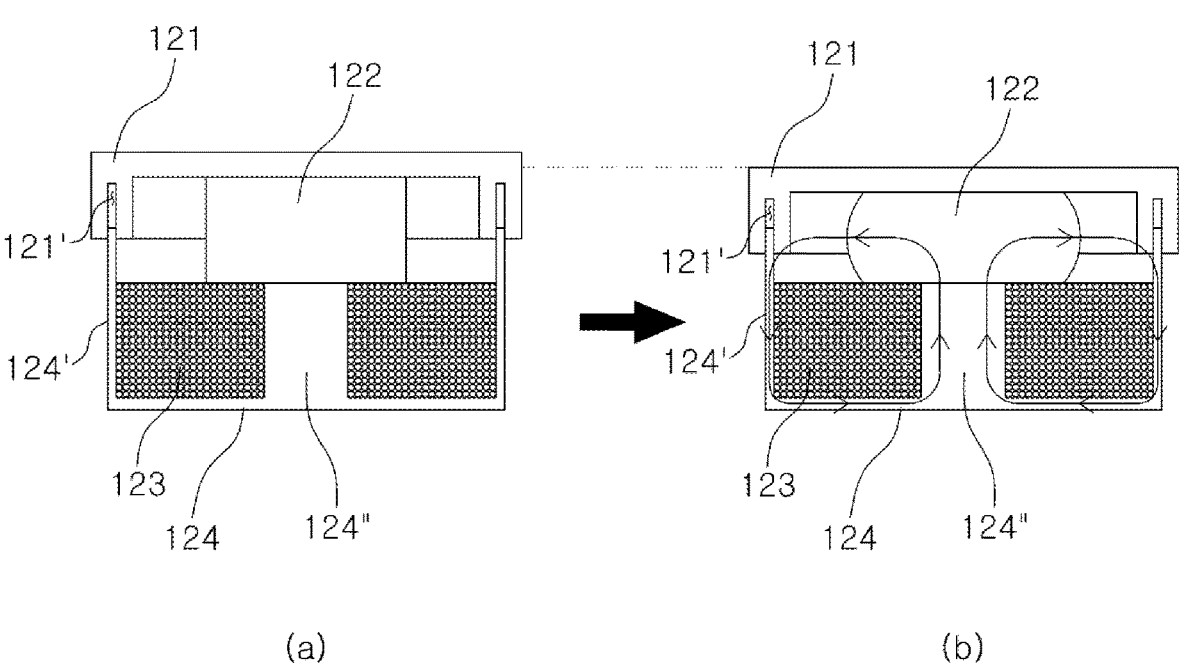
FIG. 10 shows views for illustrating an operation that is performed when the haptic unit included in the head-up haptic display device for a vehicle according to the exemplary embodiment of the present invention provides a resistance force of a first magnitude.

FIG. 10 shows views for illustrating an operation that is performed when the haptic unit included in the head-up haptic display device for a vehicle according to the exemplary embodiment of the present invention provides a resistance force of a first magnitude.

When a pressing input is not sensed, the control unit 130 may perform control so that a magnetic field is not generated from the coil 123 by interrupting the current applied to the coil 123, as shown in (a) of FIG. 10.

Thereafter, when a pressing input is sensed in the button area BA, the control unit 130 may perform control so that a magnetic field is generated from the coil 123 by applying current to the coil 123, as shown in (b) of FIG. 10.

At this time, the control unit 130 may apply the current to the coil 123 so that a magnetic field of a first intensity is generated from the coil 123.

Here, the magnetic field of the first intensity may be a magnetic field that causes the magnetorheological elastic body 122 to have a rigidity capable of providing the resistance force of the first magnitude when applied to the magnetorheological elastic body 122.

Figure 11:
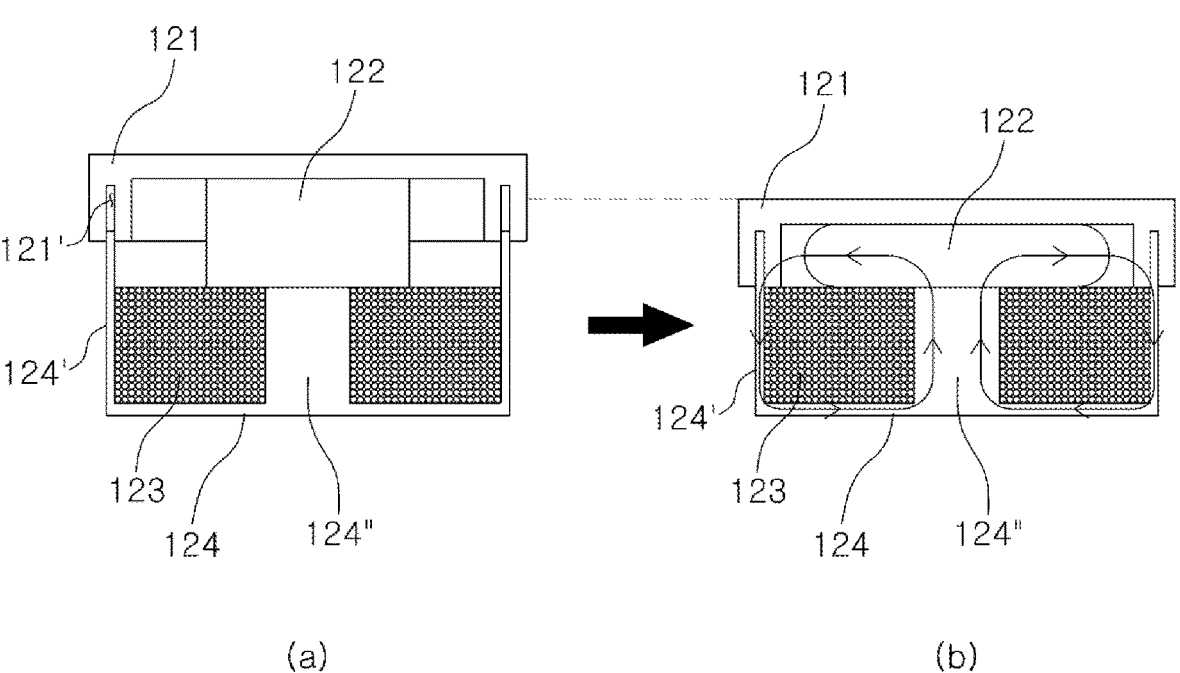
FIG. 11 shows views for illustrating an operation that is performed when the haptic unit included in the head-up haptic display device for a vehicle according to the exemplary embodiment of the present invention provides a resistance force of a second magnitude.

FIG. 11 shows views for illustrating an operation that is performed when the haptic unit included in the head-up haptic display device for a vehicle according to the exemplary embodiment of the present invention provides a resistance force of a second magnitude.

When a pressing input is not sensed, the control unit 130 may perform control so that a magnetic field is not generated from the coil 123 by interrupting the current applied to the coil 123, as shown in (a) of FIG. 11.

Thereafter, when a pressing input is sensed in the non-button area BA', the control unit 130 may perform control so that a magnetic field is generated from the coil 123 by applying current to the coil 123, as shown in (b) of FIG. 11.

At this time, the control unit 130 may apply the current to the coil 123 so that a magnetic field of a second intensity is generated from the coil 123.

Here, the magnetic field of the second intensity may be a magnetic field that causes the magnetorheological elastic body 122 to have a rigidity capable of providing the resistance force of the second magnitude when applied to the magnetorheological elastic body 122.

Although the present invention has been described with reference to the preferred exemplary embodiments, it will be understood by one skilled in the art that various modifications and variations to the present invention can be made without departing from the technical spirit and scope of the present invention defined in the following claims.

REFERENCE SIGNS LIST

100: head-up haptic display device for vehicle
110: display unit
120: haptic unit
121: cover
122: magnetorheological elastic body
123: magnetic field generator
124: housing
130: control unit

What is claimed is:

1. A head-up haptic display device for a vehicle comprising:
 a display unit configured to display information on a display area and to sense a touch input and a pressing input of a user with respect to the display area;
 a haptic unit configured to provide the display area with vibration, and a resistance force with respect to the pressing input; and
 a control unit configured to control the haptic unit,
 wherein the display area comprises a button area and a non-button area, wherein the haptic unit is further configured to:
  provide a first resistance force when the pressing input is applied to the button area; and
  provide a second resistance force, which is greater than the first resistance force, when the pressing input is applied to the non-button area,
 wherein the display unit is configured to exhibit different displacement states relative to the haptic unit, depending on whether the first resistance force or the second resistance force is provided, and
 wherein the different displacement states are generated by a mechanical interaction between the display unit and the haptic unit caused by different magnitudes of the first resistance force and the second resistance force.

2. The head-up haptic display device for a vehicle of claim 1, wherein when it is determined that the touch input is sensed in the non-button area and is then sensed in the button area, the control unit controls the haptic unit to provide the vibration to the display area.

3. The head-up haptic display device for a vehicle of claim 1, wherein when it is determined that the touch input is sensed in the button area, the control unit controls the haptic unit to provide the vibration to the display area.

4. The head-up haptic display device for a vehicle of claim 1, wherein the haptic unit comprises:
 a cover installed on a rear surface of the display unit;
 a housing formed in a tubular shape with one side open, the open side being closed with the cover, and an accommodation space being formed inside the housing;
 a magnetorheological elastic body configured to support the cover in a state in which one surface is in contact with an inner surface of the cover, the magnetorheological elastic body being accommodated in the accommodation space and having a thickness and a rigidity that change depending on an applied magnetic field; and
 a magnetic field generator accommodated in the accommodation space and configured to generate the magnetic field in the magnetorheological elastic body.

5. The head-up haptic display device for a vehicle of claim 1, wherein the control unit is configured:
 to control whether to generate a magnetic field by the magnetic field generator and an intensity of the magnetic field so that the thickness of the magnetorheological elastic body is changed to provide the vibration to the display area, and
 to control whether to generate a magnetic field by the magnetic field generator and an intensity of the magnetic field so that the rigidity of the magnetorheological elastic body is changed to provide the resistance force to the display area.

* * * * *